(12) United States Patent
Lepert et al.

(10) Patent No.: US 6,330,145 B1
(45) Date of Patent: *Dec. 11, 2001

(54) APPARATUS AND METHOD FOR CONTACTING A SENSOR CONDUCTIVE LAYER

(75) Inventors: Arnaud Yves Lepert, Lafayette, CA (US); Danielle A. Thomas, Dallas; Antonio A. Do-Bento-Vieira, Coppell, both of TX (US)

(73) Assignee: STMicroelectronics, Inc., Carrollton, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,346

(22) Filed: Dec. 30, 1998

(51) Int. Cl.$^7$ ............................................. G06K 9/28
(52) U.S. Cl. ................................... 361/220; 382/124
(58) Field of Search ................................ 382/124, 312, 382/313; 324/661–663, 658; 361/220, 232, 233

(56) References Cited

U.S. PATENT DOCUMENTS

| | | | |
|---|---|---|---|
| 3,921,167 | 11/1975 | Fox | 340/365 C |
| 3,974,332 | 8/1976 | Abe et al. | 178/18 |
| 4,194,083 | 3/1980 | Abe et al. | 178/18 |
| 4,290,052 | 9/1981 | Eichelberger et al. | 340/365 C |
| 4,353,056 | 10/1982 | Tsikos | 340/146 |
| 4,394,773 | 7/1983 | Ruell | 382/4 |
| 4,766,474 | 8/1988 | Nakagawa et al. | 357/23.8 |
| 5,325,442 | 6/1994 | Knapp | 382/4 |
| 5,331,580 | 7/1994 | Miller et al. | 364/708.1 |
| 5,463,388 | 10/1995 | Boie et al. | 341/33 |
| 5,514,612 | 5/1996 | Rao et al. | 437/51 |
| 5,648,642 | 7/1997 | Miller et al. | 178/18 |

(List continued on next page.)

FOREIGN PATENT DOCUMENTS

| | | | |
|---|---|---|---|
| 0790479 | * 8/1997 | (EP) | G01B/7/00 |
| 404025200 A | 1/1992 | (JP) | H05K/7/14 |

OTHER PUBLICATIONS

Tartagni, et al., "A 390 dpi Live Fingerprint Imager Based on Feedback Capacitive Sensing Scheme", 1997 IEEE International Solid–State Circuits Conference, 1997. No month.

R.F. Wolffenbuttel and P.O.L. Regtien, "Integrated Tactile Imager with an Intrinsic Contour Detection Option", *Sensor and Actuators*, Jan./Feb. 1989, No. ½, pp. 141–153.

N.D. Young, et al., "Novel Fingerprint Scanning Arrays Using Polysilicon TFT's of Glass and Polymer Substrates", IEEE Electron Device Letters, V. 18, No. 1, Jan., 1997, pp. 19–20.

"Physics of Semiconductor Devices", by S.M. Sze, John Wiley & Sons, Inc., 1981, pp. 30–33.

"A Fingerprint Sensor Based on the Feedback Capacitive Sensing Scheme", by Marco Tartagni and Guerrieri, IEEE Journal of Solid–State Circuits, vol. 33, No. 1, Jan., 1998.

*Primary Examiner*—Ronald W. Leja
(74) *Attorney, Agent, or Firm*—Lisa K. Jorgenson; Daniel E. Venglarik

(57) ABSTRACT

A structure and method is disclosed for grounding an electrostatic discharge device of an integrated circuit to dissipate electrostatic charges comprising an underlying dielectric layer disposed over capacitor plates of sensor circuitry and a conductive layer disposed over the underlying dielectric layer, wherein the conductive layer diffuses electrostatic charges at the surface of the integrated circuit to ground. The conductive material not only dissipates electrostatic charges to the ground, but may also protect at least a portion of the edge of the sensor chip from mechanical stress.

34 Claims, 3 Drawing Sheets

U.S. PATENT DOCUMENTS

| | | | |
|---|---|---|---|
| 5,778,089 | * | 7/1998 | Borza .................................... 382/124 |
| 5,847,690 | | 12/1998 | Boie et al. ........................... 345/104 |
| 5,862,248 | * | 1/1999 | Salatino et al. ...................... 382/124 |
| 5,907,627 | | 5/1999 | Borza .................................... 382/124 |
| 6,091,082 | * | 7/2000 | Thomas et al. ...................... 382/312 |
| 6,114,862 | | 9/2000 | Tartagni et al. ..................... 324/662 |
| 6,163,313 | | 12/2000 | Aroyan et al. ....................... 345/173 |
| 6,180,989 | | 1/2001 | Bryant et al. ........................ 257/414 |

* cited by examiner

APPARATUS AND METHOD FOR CONTACTING A SENSOR CONDUCTIVE LAYER

CROSS REFERENCE TO A RELATED APPLICATION

The following related patent applications, each showing a type of electrostatic discharge protection method and apparatus, are incorporated herein by reference and with which the present invention finds utility: U.S. patent application Ser. No. 08/927,450, STMicroelectronics Docket No. 97-B-037, filed Sep. 11, 1997 and titled Electrostatic Discharge Protection of a Capacitive Type Fingerprint Sensing Array; U.S. patent application Ser. No. 09/144,182, filed Aug. 31, 1998, and titled Selectively Doped Electrostatic Discharge Layer for an Integrated Circuit Sensor; U.S. patent application Ser. No. 09/224,812, STMicroelectronics Docket No. 97-B-179, filed on the same date herewith, and titled Static Charge Dissipation for an Active Circuit Surface; U.S. patent application Ser. No. 09/224,812, STMicroelectronics Docket No. 98-B-085, filed on the same date herewith, and titled Static Charge Dissipation Pads for Sensors; U.S. patent application Ser. No. 09/224,815, STMicroelectronics Docket No. 98-B-088, filed on the same date herewith, and titled Apparatus and Method for Contacting a Conductive Layer; U.S. patent application Ser. No. 09/223,707, STMicroelectronics Docket No. 98-B-090, filed on the same date herewith, and titled Topographical Electrostatic Protection Grid for SENSORS; and, STMicroelectronics Docket No. 98-B-82/86, filed on the same date herewith, and titled ELECTROSTATIC DISCHARGE PROTECTION FOR Sensors as U.S. patent application Ser. No. 09/223,629.

TECHNICAL FIELD OF THE INVENTION

The present invention relates in general to the field of static discharge dissipation, and more particularly, to a method of grounding an embedded conductive electrostatic protection layer during packaging.

BACKGROUND

Without limiting the scope of the invention, its background is described in connection with the protection of integrated circuit fingerprint sensors from the environment during regular use, as an example.

Heretofore, in this field, the detection of fingerprint patterns, composed of lines or ridges and valleys, has been useful for the identification of specific individuals based on the observation that each individual person has a unique fingerprint. Fingerprints, therefore, can be used not only to positively identify individuals, but to exclude individuals whose fingerprint profile does not match a pre-existing set of patterns.

Fingerprint sensing has evolved from optical and mechanical sensing technologies that acquire a fingerprint image. In those systems, generally, the mechanical and optical sensors obtain a fingerprint image using a scanner or a camera, process the acquired information into an analog or digital signal that can be analyzed, and provide an output based on the acquired signal. Unfortunately, the lighting and contrast conditions available at the time the image is acquired affects the analysis of the acquired data and consequently affects the sensor output. Furthermore, image capture systems are easily tricked using false images. In addition, conventional optical sensors usually require bulky optics, making these types of sensors impractical for portable systems.

Another class of fingerprint sensors are capacitive sensors, such as that disclosed in U.S. Pat. No. 4,353,056 issued to Tsikos. The Tsikos patent demonstrates the use of a sensor that incorporates a sensing member that has a sensing surface for receiving a fingerprint. The sensing surface has a means for sensing the ridges and valleys of the skin of the finger under observation. The sensing member contains a multitude of capacitors that sense the patterns of the fingerprint when the finger is pressed against the sensing surface. The information obtained by the sensing member is transformed into an electric signal. The capacitors are insulated from the environment of use by a flexible membrane that conforms itself to the contour of the fingerprint. Unfortunately, the repeated cycles of flexing and compression of the flexible membrane can lead to device failure and the need to replace the membrane.

U.S. Pat. No. 4,385,831 issued to Ruell, et al., discloses a fingerprint sensor that provides an electrical output signal in response to the topography of the fingerprint. The sensor incorporates a contact body that is formed, at least in part, by a light transparent elastic material. The elastic contact material may be attached to a flat sensor plate that has a light receiving surface. The sensor also incorporates a light source and a photodetector to measure the valleys and ridges of the fingerprint. The elastic nature of the contact body causes cycles of compression and flexing that again lead to the deterioration of the contact point between the sensor and the finger.

It has also been found that the current methods and structures for protecting sensors from the environment of intended use fail to address the distinct environmental exposures to which the sensors are exposed, in particular, electrostatic build-up on, e.g, human skin or any other object that may come into close proximity with or contact the sensor. Sensor protection versus sensitivity must generally be carefully balanced to achieve both an acceptable signal-to-noise ratio and adequate protection. Generally, as sensor protection increases, sensor sensitivity decreases. In the case of electrical damage to sensor surface structures or the active circuits that form part of the sensor circuitry during use, present electrostatic discharge circuitry fails to protect the sensor circuitry during an electrostatic discharge.

As sensors and users can be exposed to a wide variety of environmental conditions that can cause a great increase in electrical potential in comparison to objects that are at a different potential or grounded, it has now been found that sensors should be fitted with electrostatic discharge protection to be durable. For example, when the user approaches the sensor at a great voltage disparity, a sudden electrical discharge may cause operational failure of the sensor, such failure may be temporary or permanent.

Typical electrostatic discharge protection circuits for solid state arrays may be relatively poor, since in this type of circuit configuration, it is usual to connect the cell's buried and ungrounded capacitor plates to transistor gates and/or to connect the cell's ungrounded and buried capacitor plates to system ground potential by way of reverse biased diodes. In this type of construction and arrangement, the electrostatic charge sometimes carried by a human body and its fingertip, which may be in the range of several kilo volts (kV) or more, may be sufficiently high to break through the solid state cell's upper dielectric/passivation layer. If this breakthrough occurs, the potential is raised at ungrounded circuit nodes that are associated with the buried capacitor plates and may cause damage to the associated array cell. Damage to the data or the sensor must be avoided, while the sensitivity of the sensor is maintained at close to optimal levels.

Another significant problem of the current structures for the protection of fingerprint sensors is contamination from substances, such as oils and proteins that are found on the surface of fingers. To remove these contaminants, it is often necessary to use organic or inorganic solvents or detergents to clean the sensor surface. Therefore, the electrostatic discharge protection must be resistant to these often corrosive compounds.

Another area of concern is hygiene. Fingers, as well as the environment, tend to contain a number of microbes and bacteria that are removed from the sensor along with the other contaminants. To remove these microbes and bacteria and reduce the chance of contagion between users, antibacterial, antifungal and decontaminating agents are often used to clean the sensors. These decontaminating agents often include harsh abrasives, enzymes, organic or inorganic solvents or detergents. Therefore, any electrostatic discharge protection must be resistant to these often corrosive cleaning compounds.

What is needed is a structure and method to protect sensors from electrostatic discharges, while at the same time maintaining the sensors ability to withstand mechanical stress. The structure must not only permit continued functioning of the sensor during normal use, but also withstand, among others, the extreme conditions of humidity, electricity, heat, light, etc., to which the sensor may be exposed. The sensor electrostatic discharge structure should also be resistant to chemical detergents and solvents, but still be compatible with the underlying components of the sensor.

SUMMARY OF THE INVENTION

The present invention provides a method of and system for providing electrostatic discharge capability for a sensor circuit, such as a fingerprint sensor. In a type of sensor array with which this invention finds utility, each sensing cell includes ungrounded metal capacitor plates covered by a dielectric. An ungrounded object, such as a fingertip which comes close to or in contact with the dielectric forms a third capacitor plate between the metal capacitor plates. An electrostatic charge sometimes carried by a human body may be sufficiently high to break through the dielectric layer covering the metal capacitor plates. The present invention improves the electrostatic discharge performance of such a sensor array.

The present invention is directed to a process and apparatus for dissipating electrostatic charges from a sensor chip to ground including, a dielectric layer wherein the dielectric layer isolates the conductive plates and protects the conductive plates from damage. A conductive layer is generally disposed over or adjacent to one or more conductive plates, wherein the conductive layer dissipates an electrostatic charge in a manner that prevents the electrostatic charge from reaching the plurality of conductive plates. A passivation layer is disposed over at least a portion of the dielectric layer and a support having a ground, the sensor chip being affixed to the support and a conductive material electrically connecting the conductive layer of the sensor chip to the ground of the support.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of ways to make and use the invention and do not delimit the scope of the invention.

Figure 1:
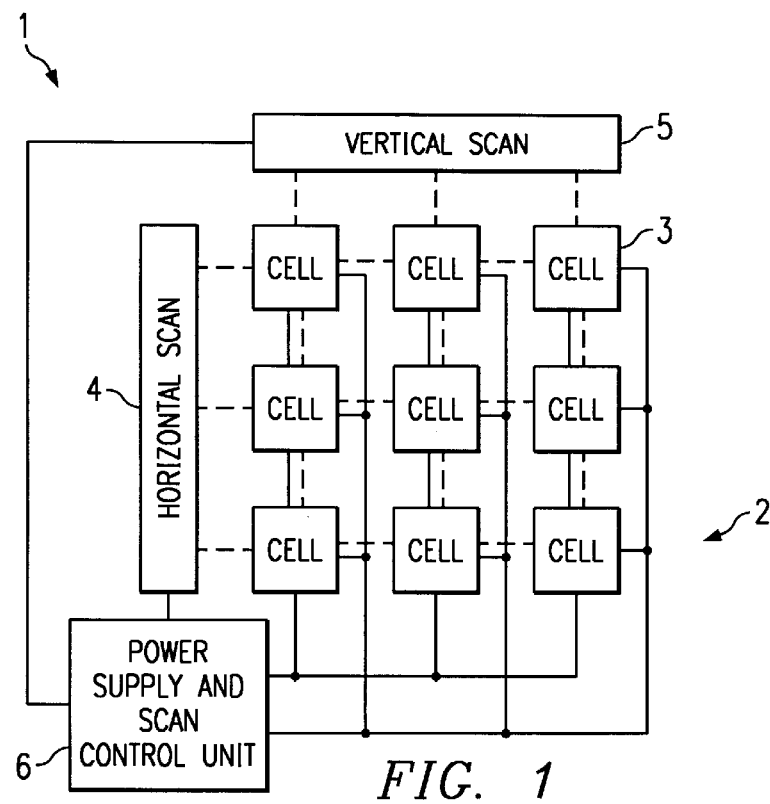
FIG. 1 is a block diagram of a sensor array according to the present invention.

By way of background, referring now to FIG. 1, there is shown a block diagram of a user input device 1. User input device 1 is preferably integrated into a single chip, and it includes an array 2 of sensors or pixel cells 3. For purposes of illustration, array 2 is shown comprising nine cells 3. In an actual device, more than nine cells would more likely be included. Each individual sensing cell 3 represents one pixel of the array 2 and is generally smaller than the width of a fingerprint ridge. Enough cells 3 are included in array 2 so that several ridges and valleys of a fingerprint may be detected. In a preferred embodiment, pixel cells 3 are on a pitch of approximately 50 km, which corresponds to a resolution of approximately 508 dots per inch (dpi) for a fingerprint image.

Device 1 includes a horizontal scanning stage 4 and a vertical scanning stage 5. Scanning stages 4 and 5 enable detection from one cell in array 2 at a time according to a predetermined scanning pattern.

Input sensor device 1 includes a power supply and scan control unit 6. Power supply and scan control unit 6 supplies a reference voltage to each cell 3 of array 2. Power supply and scan control unit 6 also operates to scan stages 4 and 5 to produce the desired scanning of cells 3.

Figure 2:
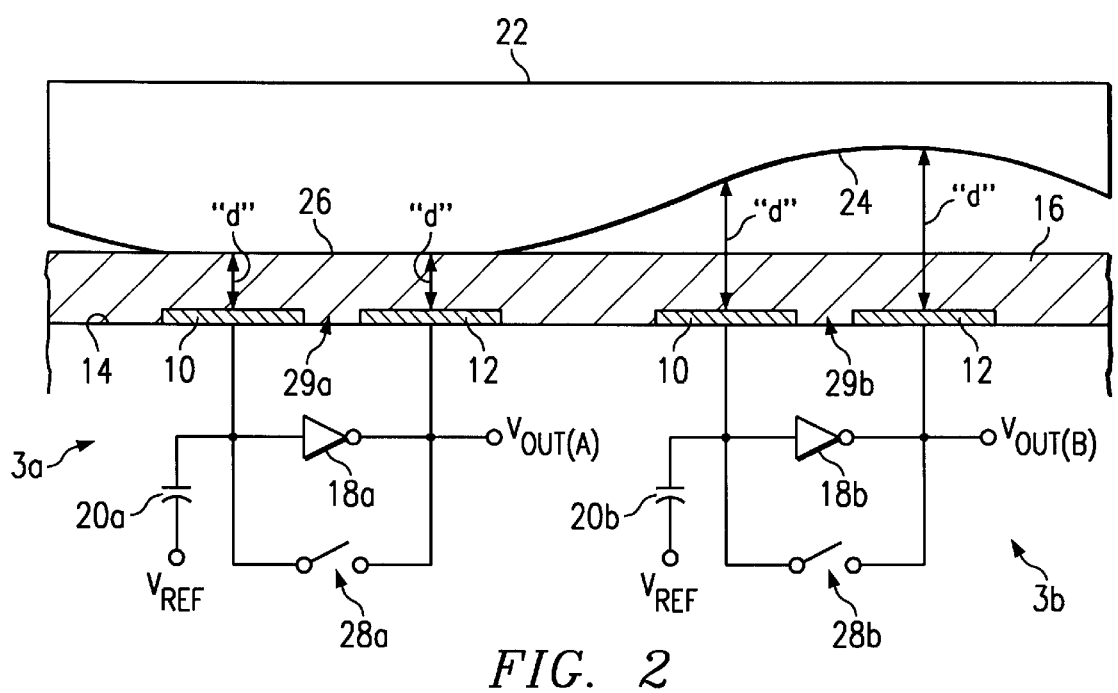
FIG. 2 illustrates the physical structure of the individual sensor cells and their electrical operation according to the present invention.

By way of further background, referring now to FIG. 2, there is illustrated the structure and operation of a cell 3. The preferred cell of the present invention is of the type disclosed in Tartagni, U.S. patent application Ser. No. 08/799,543, filed Feb. 13, 1997, titled Capacitive Distance Sensor, the disclosure of which is incorporated herein by reference. The technology of the present invention uses an active pixel design based on a capacitive feedback sensing circuit.

Each cell 3 (3a, 3b) includes a first conductor plate 10 and a second conductor plate 12 supported on a semiconductor substrate (shown below with reference to FIG. 3), which is preferably a conventional silicon substrate that may have a shallow epitaxial layer at an upper surface region 14 of the silicon substrate. The top surface of the substrate includes an insulating layer 16. Insulating layer 16 is preferably an oxide layer, which may be a conventional thermally deposited silicon dioxide layer. Insulating layer 16 may further comprise a protective or passivation coating preferably of a hard or ultra-hard material. With an added protective coating, insulating layer 16 protects sensor 3 from abrasion, contamination, and electrostatic discharge.

Each cell 3 includes a high-gain inverting amplifier 18 (18a, 18b). The input of amplifier 18 is connected to a reference voltage source Vref through an input capacitor 20 (20a, 20b). The output of each amplifier 18 is connected to an output $V_{out}$ ($V_{outa}$, $V_{outb}$). The input of each amplifier 18 is also connected to the respective conductor plate 10 and the output of each amplifier 18 is also connected to the respective conductor plate 12, thereby creating a charge integrator whose feedback capacitance is the effective capacitance between the two conductor plates 10 and 12.

When no object is placed on the surface of insulating layer 16, the effective capacitance between plates 10 and 12 is the fringing capacitance seen through layer 16 and the air near the surface of the sensor at region 29 (29a, 29b). The distance between plates 10 and 12 at region 29 is approximately 2 microns. When an object 22, such as a finger, is placed on the surface of insulating layer 16, the conductive properties of the object (e.g., skin surface) and the proximity of the object to the sensor surface will act to modify the capacitance coupling between plates 10 and 12. The object is separated from plates 10 and 12 by a total dielectric layer that includes both the insulating layer 16 and a variable thickness of air between layer 16 and the object. Because fingerprint valleys or pores 24 will be farther from the sensor surface than finger ridges 26, sensors 3 beneath valleys or pores 24 will have more distance between their conductor plates 10 and 12 and the skin surface than sensors 3 under ridges 26. The thickness "d" of this total dielectric layer will modulate the capacitance coupling between plates 10 and 12 of each cell 3. Accordingly, sensors 3 under valleys or pores 24 will exhibit a different effective capacitance than sensors 3 under ridges 26. As shown in FIG. 2, the effective capacitance of sensor 3a is different from the effective capacitance of sensor 3b. $V_{OUTA}$ will differ from $V_{OUTB}$ since $V_{OUT}$ is inversely proportional to the effective feedback capacitance.

Scanning stages 4 and 5 of FIG. 1 now operate to sequentially enable the reading or interrogation of the many cells 3 within array 2. Sensors 3 work in two phases. During the first phase, the amplifier 18 is reset with a switch 28 (28a, 28b) by shorting the input and output of amplifier 18. This causes amplifier 18 to settle at its logical threshold. During the second phase, a fixed charge is input to the amplifier, causing an output voltage swing inversely proportional to the feedback capacitance, which is the effective capacitance between conductor plates 10 and 12. This effective feedback capacitance is now the capacitance between plates 10 and 12 seen across the total dielectric at a distance "d" which includes layer 16 and air between the finger 22 and the top of layer 16.

For a fixed amount of input charge, the output of amplifier 18 will range between two extremes depending on the effective feedback capacitance value. The first extreme is a saturated voltage level if the effective feedback capacitance is very small. The second extreme is a voltage close to the logical threshold, which is the reset value, when the effective feedback capacitance is large. Since the distance between the skin and the sensor changes the effective feedback capacitance of the charge integrator, the output of sensor 3a under ridge 26 will be different from the output of sensor 3b under valley 24. The entire fingerprint pattern can thus be digitized by sensing the differences in adjacent pixel cell capacitive values. It is also important to note that a conductive path to ground should be provided to or around each pixel (not shown), such that an electrostatic discharge is dissipated though the conductive path to ground rather than through the circuitry of the pixel and to ground. To be effective, such electrostatic discharge layer must present a more conductive path to ground than any paths to ground through the internal circuitry of the pixels and any dielectrics insulating the circuitry from the environment.

The structure and method of the present invention may be used with a wide variety of imaging sensors, such as the fingerprint sensor described herein by way of example, and as will be known to those skilled in the art in light of the present disclosure.

As noted above, in using the described capacitance-coupled sensor, resolutions of up to 508 dpi can be achieved. With improvements in image processing algorithms, sensors having a resolution of 750 dpi, or more, can be expected. For use in sensing fingerprint valleys and ridges, an array 2 of cells is used to sample the fingerprint pattern. The entire chip may also contain additional timing and voltage controls and references in addition to the above described controls and references.

Figure 3:
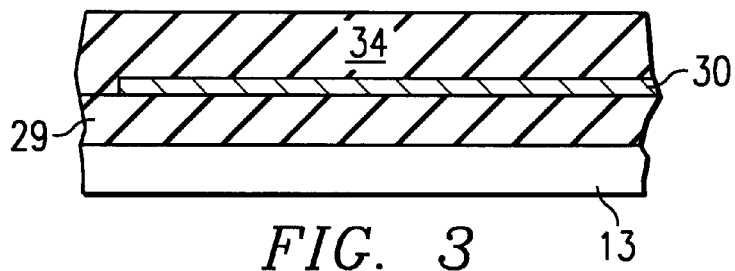
FIGS. 3 through 6 are cross-sectional views of the formation of a basic structure for grounding an electrostatic discharge protection system according to the present invention.

The structure and method for dissipating the electrostatic discharge and protecting the pixel cell will now be described. In FIG. 3, a cross-sectional view of the contact for an electrostatic discharge potential ground and its component layers is shown. Electrostatic discharge protection relative to electrostatic potential that may be carried by an object such as an ungrounded fingertip, is provided by placing a conductive layer 30 on insulating layer 16. Each pixel cell 3, such as a capacitively coupled fingerprint sensor, is formed on a silicon substrate 13. Substrate 13 may have P-type or N-type conductivity. Substrate 13 may be made of, for example, silicon, glass, gallium arsenide, silicon on insulator (SOI) structures, epitaxial formations, germanium, germanium silicon, polysilicon, amorphous silicon, or like semi-conductive or conductive substrates. Substrate 13 is typically made of single crystal silicon, and may be lightly doped with boron, phosphorous or arsenic atoms depending upon the desired conductivity.

A dielectric layer 29 may be formed over a conductive pad (e.g., conductive plate 10 or 12 depicted in FIG. 2, not shown in FIG. 3) on substrate 13, preferably by deposition techniques using plasma enhanced chemical vapor deposition (PECVD) to a thickness which will electrically isolate subsequent layers from conductor plates 10 and 12 and substrate 13. The dielectric layer 29 may be formed of any suitable dielectric material and thickness which ensures electrical isolation, for example, silicon dioxide or glass. The glass may contain, e.g., phosphorous or boron and phosphorous, which may serve to trap sodium ions from objects, such as the skin. The thickness of dielectric layer 29 may be varied, for example, by changing the time of deposition. Dielectric layer 29 is preferably between 6,000 and 12,000 angstroms. Alternatively, dielectric layer 29 may be a composite layer having a first dielectric layer and a second dielectric layer, formed of compatible dielectric materials with desired dielectric constants. If a composite layer is formed, the first layer is preferably silicon dioxide or glass and the second layer preferably silicon nitride. Each of the first and second layers may have a thickness between approximately 3,000 and 6,000 angstroms. Disposed over at least a portion of dielectric layer 29 is a conductive layer 30, which may be sputtered or may also be deposited, for example, by PECVD as will be more fully described below.

A passivation layer 34 may be formed as depicted over conductive layer 30, however, if desired, it may be formed adjacent to conductive layer 30 and including dielectric layer 29, and may also be deposited by, e.g., PECVD. The overlying passivation layer 34 may be, e.g., a hard material suitable for protecting the sensor, such as silicon carbide or a combination of silicon carbide and silicon nitride. This overlying passivation layer 34, if formed, should be thick enough to protect the sensor from abrasion and contamination yet thin enough to allow conductive layer 30 to transfer the electrostatic discharge created at the surface of dielectric layer 29 away from the active circuits of cells 3 of array 2. In a preferred embodiment, passivation layer 34 is between approximately 2,000 and 3,000 angstroms. In one embodiment, passivation layer 34 is formed from at least partially silicon carbide, thereby providing better mechanical protection than silicon dioxide or silicon nitride. Passivation layer 34, however, may combine a variety of silicon-based layers as well as other forms of mechanical and environmental protective materials.

The conductive layer 30 may be further coupled to a charge dissipation circuit (not shown), providing a conductive path to ground that is more conductive than any path paths to ground through the internal circuitry of the pixels and any dielectrics insulating the circuitry from the environment. While layer 34 is shown here as a planar layer, it may also be conformal when formed, if planar is desired, the layer 34 is etched back to form a substantially planar layer or may be formed from a material such as a spin-on-glass.

The overlying passivation layer 34 provides durability to the underlying sensor, and more particularly, to the entire dielectric layer 29. The thickness, composition and location of conductive layer 30 may be varied to optimize its ability to carry the electrostatic discharge away from sensor 3 while minimizing the effect on the sensitivity of sensor 3 caused by placing conductive layer 30 between the capacitance source, e.g., a finger, and the conductor plates of the sensor 3 (see FIG. 2).

The thickness of the conductive layer 30 may be between approximately 500 and 15,000 angstroms depending upon the desired material. The thickness of conductive layer 30 may also be increased or decreased depending on, e.g., the desired ratio of the dielectric material to conductive material in dielectric layer 29, desired resistivity levels, shape and size of dielectric layer 29, and the like. The composition of conductive layer 30 may be formed from any suitable material for charge carrying capacity and for additional damage protection. For example, aluminum or an aluminum alloy may be formed to a thickness between approximately 5,000 and 15,000 angstroms having a resistivity of approximately 0.04 ohms per square. Alternatively, a titanium layer may be formed to a thickness between approximately 500 and 1,000 angstroms with a resistivity of approximately 10 ohms per square. Alternatively, a tungsten layer may be formed to a thickness of between approximately 4,000 and 8,000 angstroms having a resistivity of approximately 0.14 ohms per square.

The conductive material chosen should have a sheet resistance low enough to allow the electrostatic charge to dissipate through this layer to prevent the electrostatic charge from reaching conductor plates 10 and 12. The materials used for each of layers 29, 30 and 34 should be chosen to minimize adhesion problems between the layers which could detrimentally affect the underlying sensor performance.

The conductive layer 30 may be deposited using the same equipment that is presently used to create the dielectric layer 29 for use with, e.g., a fingerprint sensor. Thus, the present invention presents additional advantages in cost and efficiency in manufacturing. By using the current PECVD equipment, the layers 29, 30 and 34 may be deposited at relatively low temperatures, e.g., 300 degrees Celsius or less.

Figure 4:
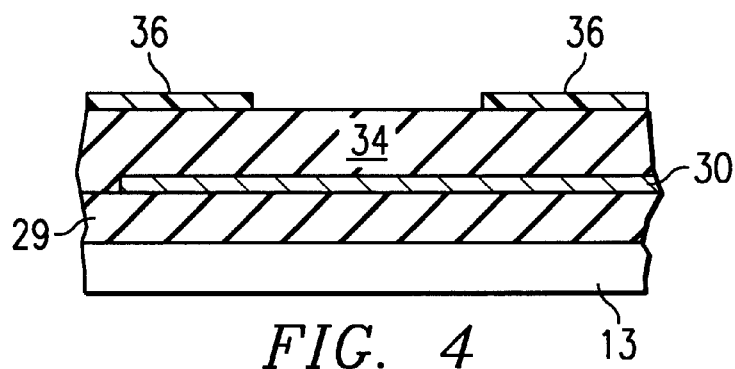

In one embodiment for forming conductive layer 30, by way of example, a titanium layer is initially blanket deposited followed by forming titanium nitride over the titanium. Next, tungsten is formed over the titanium nitride to form a composite conductive layer 30. Referring to FIG. 4, a photoresist 36 is formed and patterned to form an opening 38 in passivation layer 34 exposing selected portions or regions of conductive layer 30, preferably not overlying conductor plates.

Figure 5:
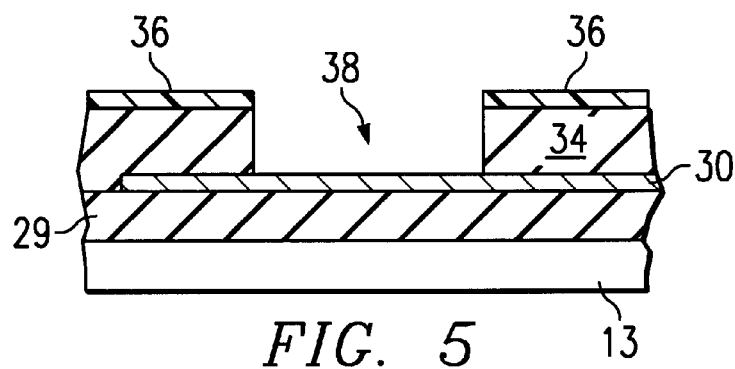
Figure 6:
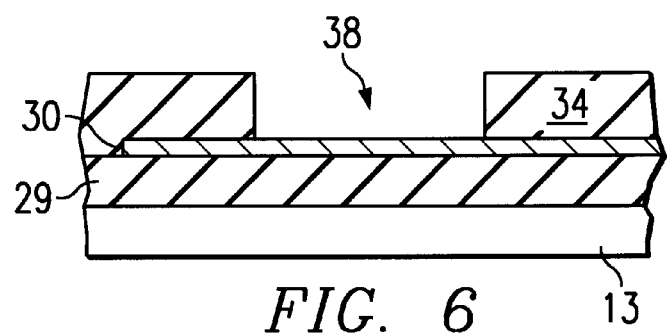

FIG. 5 shows the opening 38 and the exposed conductive layer 30 following the etching step. After removal of the photoresist 36, the structure depicted in FIG. 6 is obtained. Photoresist 36 may be removed using, e.g., a combination of ashing and wet chemical dissolution.

Figure 7:
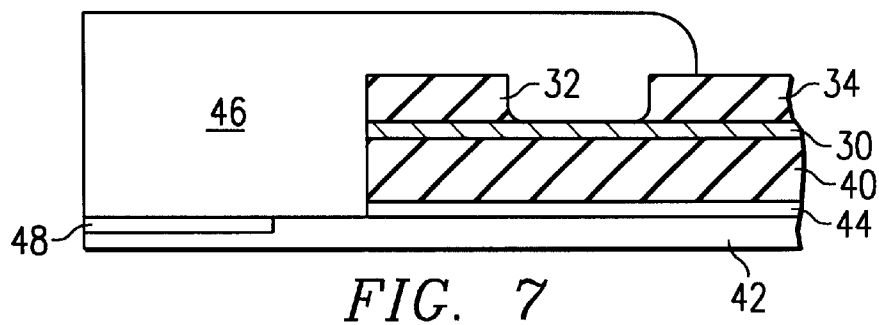
FIG. 7 is a cross-section of one embodiment of the basic contact structure for electrostatic discharge protection according to the present invention for a sensor.

FIG. 7 is a cross-sectional view of the structure for contacting and grounding the electrostatic discharge protection conductive layer 30 that dissipates electrostatic discharges formed at the sensor surface. A sensor chip 40 is depicted affixed to a support 42, which can be, e.g., a printed circuit board. The sensor chip 40 may be glued to the support 42 using, e.g., a liquid underfill polymer such as an epoxy or a plastic polymer. An adhesive 44, such as an adhesive tape or polymer is placed between support 42 and the sensor chip 40. A conductive material 46, such as a conductive epoxy, is used to fill the opening 38 in the passivation layer 34 and form an electrical contact with the conductive layer 30. Other conductive materials, such as, metals, highly doped silicon, conductive polymers, or even wire bonding may be used to form the electrical contact between the conductive layer 30 of sensor chip 40 and an electrostatic discharge electrical ground of support 42.

The conductive layer 30 is depicted exposed through an opening 38 in the passivation layer 34. Alternatively, the conductive layer 30 may extend to the edge of the sensor chip 40, thereby eliminating the need to etch an opening 38 in the mechanical protection layer 32. By extending the conductive layer 30 to the edge of the sensor chip 40, the conductive material 46 does not have to extend over the mechanical protection layer 32, while still forming the electrical contact for electrostatic charge dissipation between the conductive layer 30 and the ground 48. Both may also be contacted.

The conductive material 46 electrically connects the conductive layer 30 to a ground 48 that is on, or integral with, the support 42. In addition to providing electrical conductivity between the conductive layer 30 and the ground 48 of the support 42, the conductive material 46 protects at least a portion of the edge of the sensor chip 40 from mechanical stress that can cause chipping of, or cracks in, the sensor chip 40 circuitry to provide independent grounding for the electrostatic discharge protection system.

Figure 8:
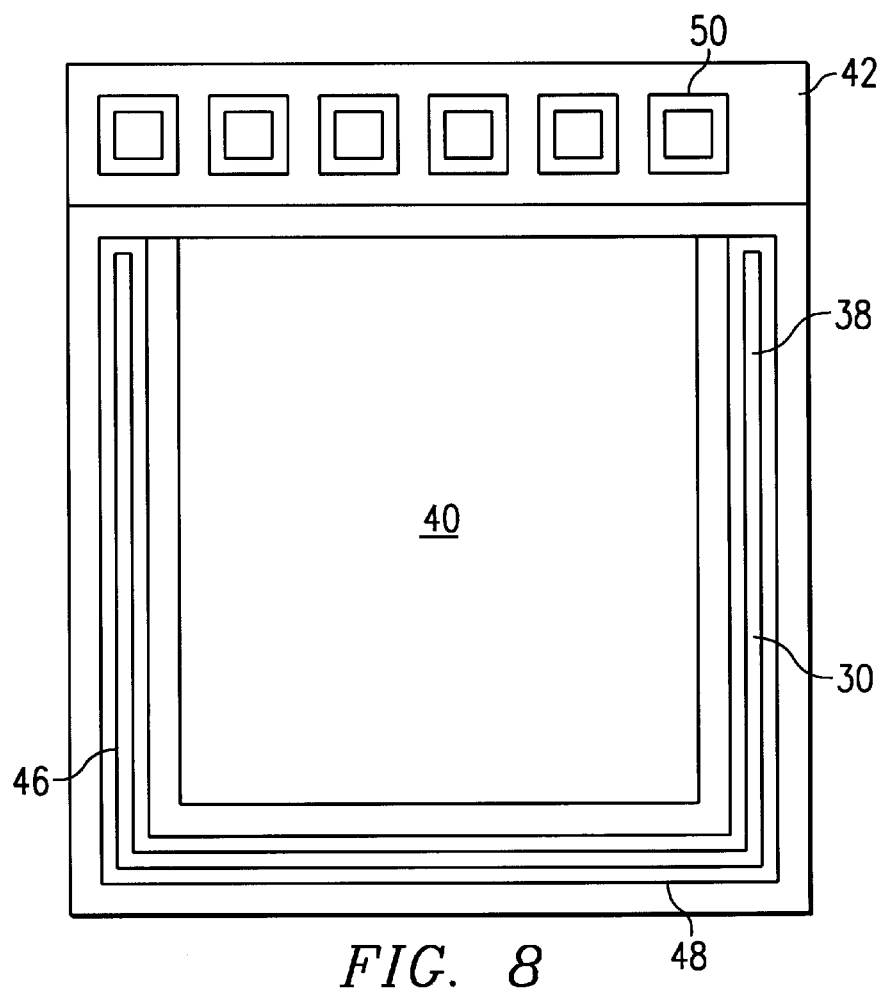
FIG. 8 is a top view of a fingerprint sensor with a grounding contact for an embedded circuit according to the present invention.

FIG. 8 is a top view of the structure for contacting and grounding the conductive layer 30 that dissipates electrostatic discharges formed at the sensor surface. The top surface of the sensor chip 40 is shown over the support 42. The sensor chip 40 has been glued to the support 42. The opening 38 in the passivation layer 34 is shown as a trench that is U-shaped around the sensor array, with the conductive layer 30 depicted in the center of the opening 38. The ground 48, also U-shaped, follows adjacent the opening 38. The conductive material 46 that electrically connects the conductive layer 30 to the ground 48 is extruded or deposited to form an electrical contact.

The conductive material 46, however, does not extend to, or cover, pads 50 that are connected to the sensor circuitry and serve to connect the silicon chip 40 to the outside. To protect the edge of the sensor chip 40 along the pads 50, a non-conductive epoxy may be deposited to protect against mechanical stress that might lead to chipping or cracking of the sensor chip 40. Furthermore, the pads 50 provide grounding for the sensor circuitry, while the ground 46 is connected to a separate ground from the sensor chip 40.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A portion of an integrated circuit package, comprising:
   a sensor chip having
      a dielectric layer over a plurality of conductive plates serving as capacitive sensor electrodes, the dielectric layer isolating the conductive plates, and
      a conductive layer disposed over at least a portion of the dielectric layer and disposed over one or more conductive plates or regions between conductive plates, wherein the conductive layer dissipates an electrostatic charge in a manner that prevents the electrostatic charge from reaching the plurality of conductive plates, the conductive layer having a contact region between a central region of the sensor chip and a periphery of the sensor chip;
   a support having a ground, the sensor chip being affixed to the support; and
   a conductive material around a portion of the periphery of the sensor chip and contacting the contact region of the conductive layer, wherein the conductive material connects the conductive layer to the support ground.

2. The integrated circuit of claim 1, further comprising:
   a passivation layer overlying the conductive layer and having an opening therethrough exposing the contact region of the conductive layer.

3. The integrated circuit of claim 1, wherein the sensor chip comprises a fingerprint sensor chip.

4. The integrated circuit of claim 1, wherein the support has pads that are electrically connected to the conductive layer of the sensor chip, at least one of the pads being a ground pad separate from the support ground.

5. The integrated circuit of claim 2, wherein the opening through the passivation layer extends around the portion of the periphery of the sensor chip to form a trench,
   wherein the conductive material extends, around the portion of the periphery of the sensor chip, from a surface of the support around a side of the sensor chip over a portion of the passivation layer between the trench and the side of the sensor chip and into the trench.

6. A portion of an integrated circuit, comprising:
   a sensor chip having
      a dielectric layer over a plurality of conductive plates serving as capacitive sensor electrodes, and
      a conductive layer disposed over at least a portion of the dielectric layer and disposed over one or more conductive plates, wherein the conductive layer dissipates an electrostatic charge, preventing the electrostatic charge from reaching the plurality of conductive plates,
   a passivation layer disposed over at least a portion of the dielectric layer and the conductive layer, the passivation having an opening therethrough between a central region of the sensor chip and a periphery of the sensor chip which exposes
   a portion of the conductive layer;
   a support having a ground, the sensor chip being affixed to the support; and
   a conductive material around a portion of the periphery of the sensor chip and contacting the exposed portion of the conductive layer, electrically connecting the conductive layer of the sensor chip and the ground of the support.

7. The integrated circuit of claim 6 wherein the conductive material comprises a conductive epoxy.

8. The integrated circuit of claim 6 wherein the conductive material comprises a conductive polymer.

9. The integrated circuit of claim 6, wherein the conductive material comprises a metal.

10. The integrated circuit of claim 6, wherein the sensor chip comprises a fingerprint sensor chip having a ground for the sensors.

11. The integrated circuit of claim 7, wherein the support has pads that are electrically connected to the sensor chip, at least one of the pads being a ground pad separate from the sensor chip support ground.

12. The integrated circuit of claim 6, wherein the conductive material is disposed along the periphery on at least three sides of the sensor chip.

13. The integrated circuit of claim 6, wherein the conductive material is disposed along substantially all of the periphery of the sensor chip.

14. The integrated circuit of claim 6, wherein the conductive material is disposed surrounding the periphery of the sensor chip.

15. The integrated circuit of claim 6, wherein the conductive material provides mechanical protection to the portion of the periphery of the sensor chip along which the conductive material is disposed.

16. The integrated circuit of claim 6, wherein the passivation layer is disposed over all of the dielectric layer and all of the conductive layer, and wherein the conductive layer is disposed over the dielectric layer and substantially over the conductive plates.

17. The integrated circuit of claim 6, wherein the conductive layer and passivation layer are substantially planar.

18. The integrated circuit of claim 6, wherein the conductive layer has a sheet resistance low enough to adequately dissipate the electrostatic charge.

19. The integrated circuit of claim 6, wherein the conductive layer comprises aluminum.

20. The integrated circuit of claim 6, wherein the conductive layer has a thickness of between approximately 5,000 to 15,000 angstroms.

21. The integrated circuit of claim 6, wherein the conductive layer has a resistivity of approximately 0.04 ohms per square.

22. The integrated circuit of claim 6, wherein the conductive layer comprises titanium.

23. The integrated circuit of claim 22, wherein the conductive layer has a thickness of between approximately 500 to 1,000 angstroms.

24. The integrated circuit of claim 6, wherein the conductive layer has a resistivity of approximately 10 ohms per square.

25. The integrated circuit of claim 6, wherein the conductive layer comprises tungsten.

26. The integrated circuit of claim 25, wherein the conductive layer has a thickness of between approximately 4,000 to 8,000 angstroms.

27. The integrated circuit of claim 25, wherein the conductive layer has a resistivity of approximately 0.14 ohms per square.

28. A method of grounding an electrostatic discharge device of an integrated circuit comprising:

forming a protective layer over a plurality of conductive plates serving as capacitive sensor electrodes, the protective layer isolating the conductive plates and protecting the conductive plates from damage, wherein the protective layer comprises a dielectric region underlying a conductive layer having an exposed portion between a central region of the integrated circuit which comprises a sensor chip in which the conductive plates are formed and a periphery of the sensor chip; and depositing a conductive material around a portion of the periphery of the sensor chip and contacting the exposed portion of the conductive layer, connecting the conductive layer of the sensor chip to a ground, wherein the conductive layer dissipates electrostatic charges through the ground.

29. The method of claim 28, wherein the sensor chip is affixed to a support having the ground.

30. The method of claim 29, wherein the conductive layer is electrically connected to the support ground, which is separate from a ground for sensor cells within the sensor chip.

31. The method of claim 28, wherein the conductive material comprises a conductive epoxy.

32. The method of claim 28, wherein the conductive material comprises a conductive polymer.

33. The method of claim 28, wherein the conductive material comprises a metal.

34. The method of claim 28, wherein the sensor chip comprises a fingerprint sensor chip.

* * * * *